US010097289B2

(12) United States Patent
Barbotin et al.

(10) Patent No.: US 10,097,289 B2
(45) Date of Patent: Oct. 9, 2018

(54) METHOD FOR REPLACING A MAIN CONTENT WITH AT LEAST ONE SECONDARY CONTENT, CORRESPONDING CONTENT REPLACEMENT DEVICE AND COMPUTER PROGRAM (71) Applicant: ENENSYS TECHNOLOGIES, Cesson-Sevigne (FR)

(72) Inventors: Yvan Barbotin, Vieux-Vy sur Couesnon (FR); Ludovic Poulain, Domloup (FR)

(73) Assignee: Enensys Technologies, Cesson-Sevigne (FR)

( * ) Notice: Subject to any disclaimer, the term of this patent is extended or adjusted under 35 U.S.C. 154(b) by 0 days.

(21) Appl. No.: 15/566,939

(22) PCT Filed: Apr. 14, 2016

(86) PCT No.: PCT/EP2016/058230
§ 371 (c)(1),
(2) Date: Oct. 16, 2017

(87) PCT Pub. No.: WO2016/166214
PCT Pub. Date: Oct. 20, 2016

(65) Prior Publication Data
US 2018/0115375 A1 Apr. 26, 2018

(30) Foreign Application Priority Data

Apr. 14, 2015 (FR) .................................... 15 53260

(51) Int. Cl.
*H04N 7/10* (2006.01)
*H04H 20/10* (2008.01)
(Continued)

(52) U.S. Cl.
CPC .......... *H04H 20/10* (2013.01); *H04N 21/222* (2013.01); *H04N 21/234* (2013.01);
(Continued)

(58) Field of Classification Search
CPC ... H04N 21/234; H04N 21/236; H04N 21/858
See application file for complete search history.

(56) References Cited

U.S. PATENT DOCUMENTS

2010/0014594 A1 1/2010 Beheydt et al.
2010/0199299 A1\* 8/2010 Chang ................ H04N 7/17318
725/32

FOREIGN PATENT DOCUMENTS

FR 2902591 12/2007
FR 2937490 A1 4/2010
(Continued)

OTHER PUBLICATIONS

International Search Report and Written Opinion dated Jun. 9, 2016 for International Application No. PCT/EP2016/058230, filed Apr. 14, 2016.
(Continued)

*Primary Examiner* — Olugbenga O Idowu
(74) *Attorney, Agent, or Firm* — David D. Brush; Westman, Champlin & Koehler, PA (57) ABSTRACT A method replacing a main content by at least one secondary content, which implements steps including: determining an instant of video breaking and an instant of audio or subtitle breaking, based on at least one breaking packet; replacing in the original stream at least one video packet and audio packet or subtitle packet respectively of the main content by at least one video packet and audio packet or subtitle packet respectively of the secondary content starting from the video and the audio or subtitle breaking instant, respectively, and at least one audio packet or subtitle packet of the main content, delivering a modified stream; updating, in the modified stream of a reference clock, continuity counters of video packets and audio packets or subtitle packets respectively and at least one video reconstruction temporal information, and audio or subtitle reconstruction respectively in the replacement video packets, and audio or subtitle packets respectively.

17 Claims, 4 Drawing Sheets (51) Int. Cl.
     *H04N 21/234*     (2011.01)
     *H04N 21/222*     (2011.01)
     *H04N 21/236*     (2011.01)
     *H04N 21/858*     (2011.01)
     *H04N 21/242*     (2011.01)

(52) U.S. Cl.
     CPC ......... *H04N 21/236* (2013.01); *H04N 21/858* (2013.01); *H04N 21/242* (2013.01)

(56) References Cited

FOREIGN PATENT DOCUMENTS

| WO | 2010005416 A1 | 1/2010 |
| WO | 2012116743 A1 | 9/2012 |

OTHER PUBLICATIONS

English Translation of the International Search Report and Written Opinion dated Jun. 9, 2016 for International Application No. PCT/EP2016/058230, filed Apr. 14, 2016.

French Search Report and Written Opinion dated Feb. 22, 2016 for French Application No. 1553260, filed Apr. 14, 2015.

Weiss S M : "Switchin Facilities in MPEG-2: Necesary But Not Sufficient", SMPTE—Motion Imaging Journal, Society of Motion Picture and Television Engineers, White Plains, NY, US, vol. 104, No. 12, Dec. 1, 1995 (Dec. 1, 1995), pp. 788-802, XP000543847.

\* cited by examiner

METHOD FOR REPLACING A MAIN CONTENT WITH AT LEAST ONE SECONDARY CONTENT, CORRESPONDING CONTENT REPLACEMENT DEVICE AND COMPUTER PROGRAM

CROSS-REFERENCE TO RELATED APPLICATIONS

This Application is a Section 371 National Stage Application of International Application No. PCT/EP2016/058230, filed Apr. 14, 2016, which is incorporated by reference in its entirety and published as WO 2016/166214 A1 on Oct. 20, 2016, not in English.

1. FIELD OF THE INVENTION

The field of the invention is that of the broadcasting of information in a broadcasting network comprising a fixed transmitter and a plurality of broadcasting sites.

More specifically, the invention relates to the terrestrial broadcasting of television services.

Yet more specifically, the invention relates to the "switching" or "breaking" (or "cutaway") of television services, enabling a main content (for example national television services such as the French TF1®, France 2®, and other services) to be replaced by at least one secondary content (for example local content such as local weather information, local news, local commercials etc.) for the broadcasting of this secondary content by a broadcasting site.

The invention can be applied especially to terrestrial broadcasting networks compliant with the DVB-T or DVB-T2 (Digital Video Broadcasting-Terrestrial) standards or future standards.

In particular, the invention can be applied to SFNs (Single Frequency Networks).

2. PRIOR ART

During a terrestrial digital broadcast, all the channels associated with a multiplex/frequency are managed in a centralized way in a device commonly called a head-end in order to create only one signal for all the broadcasting sites (i.e. the transmitters) also called a transport stream. The distribution path used between the head-end and the broadcasting sites is generally a satellite link but it can also be an IP or a microwave type link.

In the context of terrestrial digital broadcasting, SFN technology is used especially to improve the coverage of the territory/geographical zone and mitigate the effects of shadow zones related to disruptive elements in transmission (mountains, hills, valleys, large buildings etc.). It make it possible especially to reduce the number of frequencies used and therefore to release certain ranges of frequencies.

This SFN technology, which is highly efficient, implies perfect synchronization among the broadcasting sites and a strictly identical structure of the content to be broadcast by the different broadcasting sites.

The standard most widely used for broadcasting digital terrestrial television is the DVB-T standard. This standard is independent of the format of the content; for example it enables the broadcast of "normal" services as well as high-definition services.

A second version of the DVB-T standard, called DVB-T2, offers even more efficiency in terms of broadcasting, coverage, transport capacity (bit rate) and flexibility.

The problems and issues related to breaking or breaking away are well known in digital terrestrial television broadcasting also known as DTT or DTTV implementing for example the DVB-T or DVB-T2 standards.

In digital television, "breaking" is used to replace or substitute a main content, such as a television program with national coverage on the French France 3® channel for example, with a secondary content such as a television program with regional coverage on the France 3 channel. There is thus a switch from a national broadcasting head-end that is broadcasting the main content to a regional broadcasting site that broadcasts the secondary content.

Figure 1:
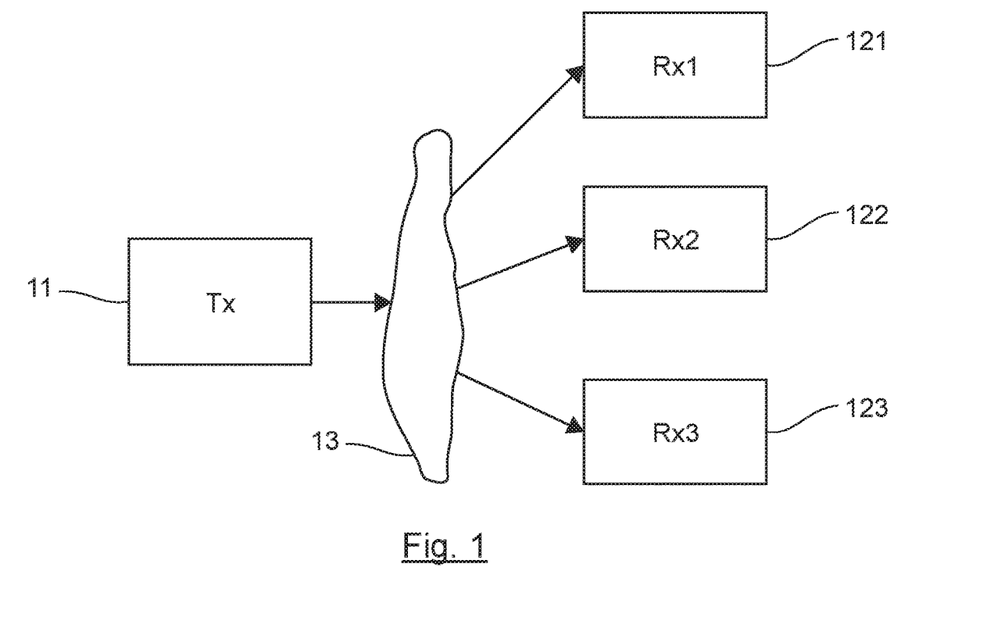
FIG. 1 illustrates an example of a digital terrestrial broadcasting network according to the prior art.

FIG. 1 illustrates an example of a digital terrestrial broadcasting network comprising a head-end Tx 11 feeding one or more broadcasting sites Rx1 121, Rx2 122, Rx3 123, implanted on distinct geographical sites. Each broadcasting site Rx1 121, Rx2 122, Rx3 123 comprises a receiver and a re-transmitter which, as the case may be, can be combined. The term "broadcasting site" is therefore understood herein to be a device or system comprising a receiver followed by re-transmitter or integrated into a re-transmitter.

Conventionally, the head-end Tx 11 generates a digital signal also called a transport stream conveyed up to the broadcasting sites Rx1 121, Rx2 122, Rx3 123 by means of a distribution network 13, for example a satellite distribution network. Such a signal is for example of the MPEG2-TS (Motion Picture Expert Group 2-Transport Stream) type or T2-MI (T2-Modulator Interface) type packetizing a plurality of MPEG2-TS streams and carrying the main content.

One or more of the broadcasting sites Rx1 121, Rx2 122, Rx3 123, can then break away in replacing the main content by a secondary content in the transport stream, and then broadcast the transport stream that is thus modified towards receiver terminals.

Such a breaking technique is especially described in the ANSI/SCTE 35 standard.

3. SUMMARY OF THE INVENTION

The invention proposes a novel solution for the implementing of such a breaking technique, in the form of a method for replacing a main content by at least one secondary content, the main content being carried by a transport stream, coming from a fixed transmitter and addressed to a plurality of broadcasting sites, called an original stream.

The invention thus proposes a novel solution for the "switching" or "breaking" of television services, enabling a main content to be replaced by at least one secondary content.

The terms "main content" or "secondary content" are understood here to denote an audiovisual content comprising a video component and at least one component of another type, for example one or more audio components and/or one or more subtitle components. Each component is transmitted in the transport stream in the form of multiplexed packets. The video packets (and audio and/or subtitle packets respectively) of the main content therefore describe the video component (and audio and/or subtitle components respectively) of the main content and the video packets (and audio and/or subtitle packets respectively) of the secondary content or contents therefore describe the video component or components (and the audio and/or subtitle components respectively) of the secondary content.

In particular, the invention proposes a novel content-replacing technique that can be used to ingeniously update different fields of the transport stream (reference clock signal, continuity counters, reconstruction temporal information etc.) so as to make sure that the content-replacing device behaves deterministically.

The proposed solution therefore modifies only the transport layer and does not modify the layer of elementary streams unlike the currently proposed solutions. In addition, it does not require any modification of the transport stream at the head-end.

In particular, the proposed solution enables the deterministic generation of a modified stream that is identical to the original stream in terms of structure and number of packets, but has its contents modified. Such a content-replacing technique according to the invention brings numerous advantages.

According to at least one embodiment, such a content-replacing technique prevents the duplicating of contents/television services during broadcasting from the head-end towards the broadcasting sites and therefore optimizes the distribution links. In particular, the invention makes it possible to avoid having as many distribution networks as there are regions/SFN cell clusters and is independent of the distribution paths between the head-end and the broadcasting sites (satellite, IP etc.).

Since the content-replacing technique is implemented in a device for replacing contents associated with at least one broadcasting site, it provides flexibility in the architecture of the network with the possibility of managing local contents in different broadcasting sites not linked to one another.

According to at least one embodiment, the proposed content-replacing technique ensures SFN broadcasting. The different broadcasting sites (re-transmission stations) of a region (i.e. an SFN cell) can thus exactly transmit a signal synchronized in frequency and above all in time with a precision of the order of 1 to 10 µs.

In particular, it can be noted that if the main content comprises several audio (and/or subtitle) components, a distinct audio (and/or subtitle) breaking instant (or start insertion) can be associated with each audio (and/or subtitle) component.

According to a first embodiment, the invention enables an immediate breaking from the main content towards a secondary content as soon as an appropriate time for switching is detected.

According to a second embodiment, the invention enables a delayed breaking from the main content towards the secondary content at a pre-defined point in time.

Whatever the embodiment chosen (immediate or delayed breaking), the first image inserted is chosen to be a reference image, and it replaces a reference image. In particular, if the content to be inserted does not begin with a reference image, a pre-processing operation can be implemented so that the first image inserted is a reference image. The switching from the main content towards the secondary content therefore takes place without any disturbance for the user.

According to at least one embodiment of the invention, the value of the different fields of the modified stream (reference clock, continuity counters, reconstruction temporal information etc.) are updated deterministically, thus enabling SFN working of the broadcasting network.

It can be noted that, classically, the reference clock is carried by the video component. This clock can therefore be updated with the video reconstruction temporal information according to the invention. As a variant, the reference clock can be carried by another component such as an audio component or a component associated with a special PID (Packet Identifier) and updated with the reconstruction temporal information associated with this component.

According to one particular embodiment of invention, the method for replacing contents also comprises a step for determining an instant of video return and at least one instant of audio or subtitle return, on the basis of a return packet of the modified stream.

Such a return packet for example has the same structure as the breaking packet. For example, such packets are of the SCTE-35 type.

The return packet may possibly be the same packet as the breaking packet if it defines the instant of video return and/or audio return and/or subtitle return or else defines a break duration starting from the instant of video breaking and/or audio breaking and/or subtitle breaking.

According to a first embodiment, the invention enables an immediate return to the main content as soon as an appropriate moment for switching is detected.

According to a second embodiment, the invention enables a delayed return to the original stream at a pre-defined instant.

Whatever the mode chosen (immediate or delayed return), the return image is chosen to be a reference image in order to improve the visual transition at the time of return to the original stream.

In one particular embodiment, the different steps of the method for replacing contents according to the invention are determined by computer program instructions.

The invention is therefore aimed at protecting a computer program comprising instructions adapted to implementing the steps of a method for replacing contents as described here above when this program is executed by a processor, as well as a computer-readable information carrier comprising instructions of a computer program as mentioned here above.

The invention also relates to a corresponding device for replacing a main content by at least one secondary content.

Such a device is especially adapted to implementing a method for replacing contents described here above.

Such a device could of course include the different characteristics of the method for replacing contents according to the invention, which can be combined or taken in isolation. Thus, the characteristics and advantages of this device are the same as those of the method for replacing contents. They are therefore not described in more ample detail.

In particular, such a device can be located at each region/SFN cell clusters (several broadcasting sites belonging to a same cluster of the SFN type) or else at each broadcasting site. Such device is for example a T2-Edge® device commercially distributed by the Applicant.

According to one particular embodiment of the invention, the secondary content or contents are preliminarily stored in the device for replacing contents.

4. LIST OF FIGURES

Other features and advantages of the present invention shall appear more clearly from the following description of at least one particular embodiment, given by way of a simple illustratory and non-exhaustive example, and from the appended figures of which.

5. DESCRIPTION OF ONE EMBODIMENT OF THE INVENTION

5.1 General Principle

The general principle of the invention is based on the deterministic insertion, into a transport stream generated by a head-end and addressed to a plurality of broadcasting sites, of video packets (and audio and/or subtitle packets respectively) of at least one secondary content, replacing video packets (and audio and/or subtitle packets respectively) of a main content.

The proposed solution relies on a particular updating of the different fields of the transport stream (reference clock, continuity counters, reconstruction temporal information etc.) enabling the modification of only the transport stream and not the elementary streams of the video, audio or subtitle type.

Figure 2:
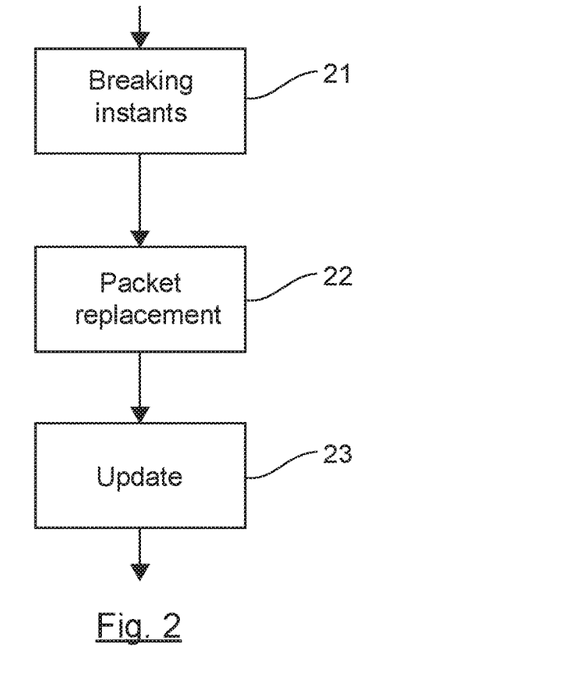
FIG. 2 presents the main steps of a method for replacing contents according to one particular embodiment of the invention.

FIG. 2 presents the main steps implemented by a device for replacing contents according to one embodiment of the invention, for the replacement of a main content (for example nationwide audio-video service to be replaced), by at least one secondary content (for example one or more local commercials).

The main content is taken as being carried by a transport stream issued by a fixed transmitter and addressed to a plurality of broadcasting sites and the device for replacing contents is located between the fixed transmitter and at least one of the broadcasting sites.

Figure 3:
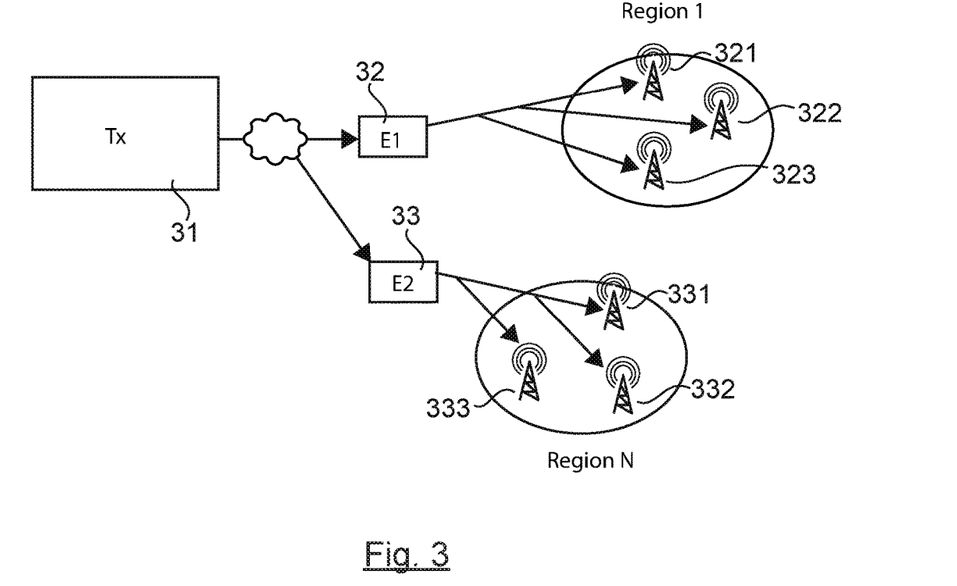
FIGS. 3 and 4 illustrate two examples of broadcasting networks implementing devices for replacing contents according to one particular embodiment of the invention.

According to a first example illustrated in FIG. 3, the device for replacing contents can be located at each region/SFN cell cluster.

According to this first example, the head-end 31 generates one or more transport streams, for example of the MPEG-TS or T2-MI type and broadcasts them to the replacement devices 32 and 33 through a distribution path. Each replacement device 32, 33 can be connected to a server of contents or to a database storing the secondary contents to be broadcast. The replacement device 32 (respectively 33) receives the original transport stream or streams, modifies them by inserting therein its own secondary streams and transmits the modified stream or streams to one or more broadcasting sites 321, 322, 323 (and 331, 332, 333 respectively).

Figure 4:
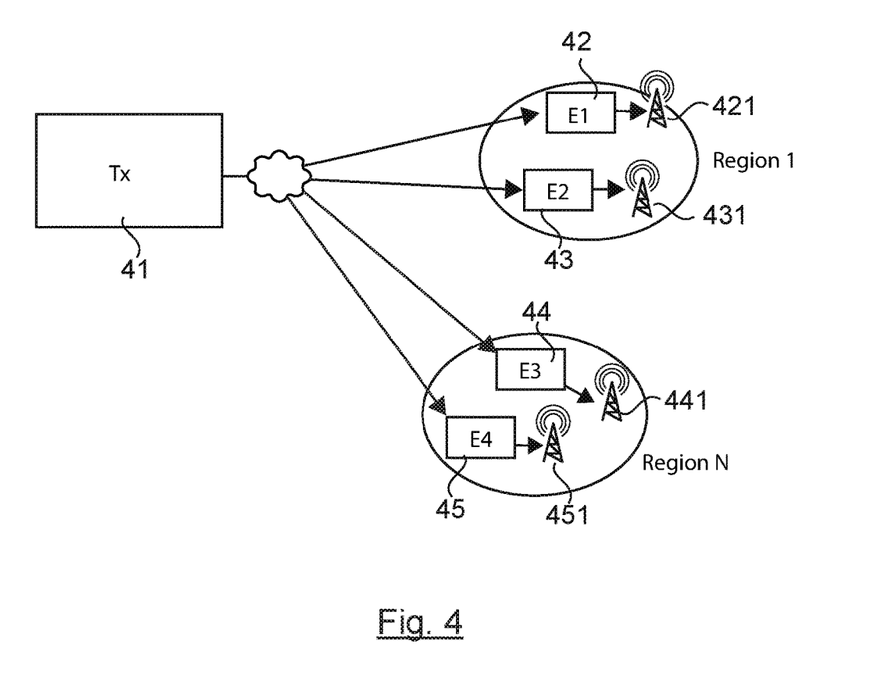

According to a second example illustrated in FIG. 4, the device for replacing contents can be located in each broadcasting site.

According to this second example, the head-end 41 generates one or more transport streams, for example of the MPEG-TS or T2-MI type and broadcasts them to the replacement devices 42, 43, 44 and 45 through a distribution path. Each replacement device 42, 43, 44 and 45 can be connected to a content server or to a database storing the secondary contents to be broadcast. Each replacement device (42, 43, 44, 45 respectively) receives the original transport stream or streams, modifies them by inserting its own secondary contents therein and transmits the modified stream or streams to the broadcasting site with which it is associated (421, 431, 441, 451 respectively). In particular, the replacement device can be integrated into the broadcasting site with which it is associated.

In particular, under the framework of the DVB-T2 standard, according to which several transport streams, each carried by a PLP (Physical Layer Pipe), can be multiplexed, the proposed solution can be implemented for each of the transport streams.

Returning to FIG. 2, the device for replacing (or replacing device) according to one embodiment of the invention implements a step 21 for determining an instant of video breaking and at least one instant of audio and/or subtitle breaking (one breaking instant per audio component and/or subtitle component) from at least one breaking packet of an original stream.

The original transport stream does carry information indicating the instant of breaking towards the secondary content, also called the instant of insertion of the secondary content, comprising for example one or more commercials. As indicated here above, these commercials can be stored in the replacement device. For example, all the commercials can be deemed to start with a reference image. In this way, the switching over from the main content to the secondary content is not perceived by a user. If the content to be inserted does not begin with a reference image, a pre-processing operation can be carried out so that the first image inserted is a reference image.

Once the instant of video breaking has been determined, the replacing device replaces (22) at least one video packet of the main content of the original stream, called a video packet to be replaced, by at least one video packet of the secondary content or by a null packet called a replacement video packet. Similarly, once the audio breaking or subtitle breaking instant has been determined, the replacing device replaces (22) at least one audio packet or subtitle packet of the main content of the original stream, called an audio packet or subtitle packet to be replaced, by at least one audio packet or subtitle packet of the secondary content or by a null packet, called a replacement audio packet or a replacement subtitle packet.

Thus a modified stream is obtained into which replacement packets are inserted. It can be noted that the replacing of the video packets and the audio or subtitle packets is done separately. Indeed, audio and therefore corresponding subtitle, if any, is sent some hundreds of milliseconds after the video.

In a third step 23, different fields present in the modified stream are updated, especially a reference clock, a continuity counter of video, audio and/or subtitle packets and at least one video, audio and/or subtitle reconstruction temporal information.

It can be noted that these different steps can be performed successively or simultaneously. In particular, the replacing step 22 and updating step 23 can be carried out simultaneously.

5.2 Example of Implementation

Here below, referring to FIGS. 5A to 5C, a description is provided of an example of implementation of the invention that can be applied to a transport stream for replacing a service consisting of a video component and an audio component. This is a purely illustrative and non-exhaustive example: a service can for example consist of a video component and several audio and/or subtitle components.

The description is also situated in the context of a DVB or DVB-T2 type broadcasting standard according to which:
  the reference clock is the PCR (Program Clock reference) clock, i.e. time stamp expressed in number of 27 Mhz clock strokes, carried by a 42-bit field, the temporal information on video reconstruction comprises a video decoding temporal information of DTS (Decoding Time Stamp) type carried by a 33-bit field and a video presentation temporal information of PTS (Presentation Time Stamp) type carried by a 33-bit field, the temporal information on audio reconstruction comprises an audio presentation temporal information of PTS type carried by a 33-bit field, and the continuity counter is of a video CC or audio CC type (according to this example, we consider only one audio component. We therefore have CC counter=CC audio.

5.2.1 Step 1: Search for Video and Audio Breaking Instants

Figure 5A:
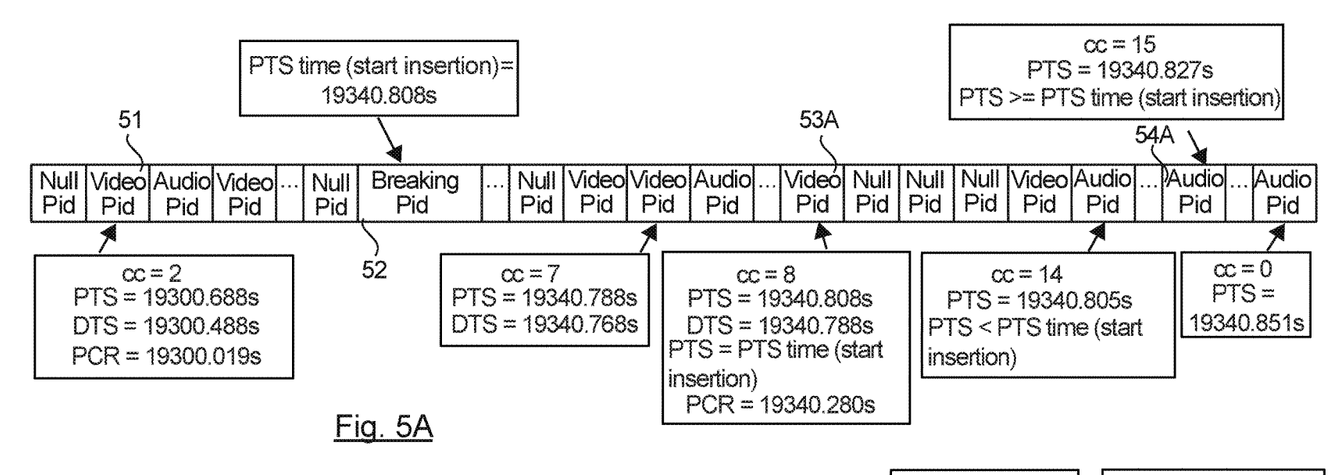
FIGS. 5A to 5C respectively represent an example of an original stream, a modified stream and a return to the original stream.

We consider first of all FIG. 5A illustrating the original transport stream (i.e. before the main content is replaced by at least one secondary content). In a simplified way, such an original stream comprises null packets, denoted as Null Pid (Packet Identifier), video packets denoted as Video Pid, audio packets denoted as Audio Pid.

Each video packet has an associated video continuity counter CC (ranging from 0 to 15 and incremented with each video packet), a video decoding temporal information of DTS type and an audio presentation temporal information of PTS type. Each audio packet has an associated audio continuity counter CC (ranging from 0 to 15 and incremented at each audio packet) and an audio presentation temporal information of PTS type.

Certain packets, video packets in the example considered, carry a reference clock.

Thus, the video packet 51 is associated with a continuity counter equal to 2, a video PTS equal to 19300.688s, a video DTS equal to 19300.488s, and a reference clock PCR equal to 19300.019s.

To switch over from a main content to at least one secondary content, it is sought first of all to determine a video breaking instant and an audio breaking instant. These information are packetized in a packet of the transport stream called a breaking packet 52. Such a breaking packet 52 uses for example the SCTE-35 protocol. This breaking packet indicates either the time of breaking away from the original stream or an "immediate" breaking away from the original stream.

In the example illustrated in FIG. 5A, the breaking packet 52 carries a breaking presentation temporal information indicating the time of the breaking, expressed in PTS time, and corresponds to a reference image. This is for example an IDR (Instantaneous Decoder Refresh) image which means that its decoding does not depend on other images. For example, the breaking packet indicates a breaking at the instant 19340.808s, denoted as a PTS time (start insertion).

To determine the instant of a video breaking, the PTS time (start insertion) is compared with the video PTS of the video packets of the original stream denoted as live video PTS. The video breaking is possible when the live video PTS of a video packet of the original stream is equal to the PTS time (start insertion). According to the example illustrated in FIG. 5A, the instant of video breaking is defined by:

PTS time(start insertion)=Live video PTS=19340.808s

The first video packet to be replaced is therefore the video packet 53A.

To determine the audio breaking instant, the PTS time (start insertion) is compared with the audio PTS of the audio packets of the original stream, denoted as a live audio PTS. The audio breaking is possible when the live audio PTS of an audio packet of the original stream is greater than or equal to the PTS time (start insertion). According to the example illustrated in FIG. 5A, the instant of audio breaking is defined by the live audio PTS such that:

Live audio PTS≥PTS time(start insertion)=19340.808s

The first audio packet to be replaced is therefore the audio packet 54A which presents an audio PTS equal to 19340.827s corresponding to the instant of audio breaking.

According to another example, not shown, the breaking packet indicates an immediate breaking. According to this example, the appropriate moment is also chosen for the breaking.

Thus, to determine the instant of video breaking, a search is made for the first reference image encoded in a packet following the breaking packet in the original stream. The breaking presentation temporal information associated with this first reference image, denoted as live video PTS, corresponding to the video breaking instant is memorized:

PTS time(start insertion)=Live Video PTS

To determine the instant of audio breaking, the PTS time (start insertion) is compared with the audio PTS of the audio packets of the original stream, denoted as live audio PTS. The audio breaking is possible when the live audio PTS of an audio packet of the original stream is greater than or equal to the PTS time (start insertion).

5.2.2 Step 2: Replacement of Video and Audio Packets

Starting from the instant of video breaking (and until an instant of video return), the video packets of the original stream are replaced by replacement video packets, belonging to at least one secondary content. Similarly, starting from the instant of audio breaking (and until an instant of audio return), the audio packets of the original stream are replaced by replacement audio packets belonging to at least one secondary content.

Figure 5B:
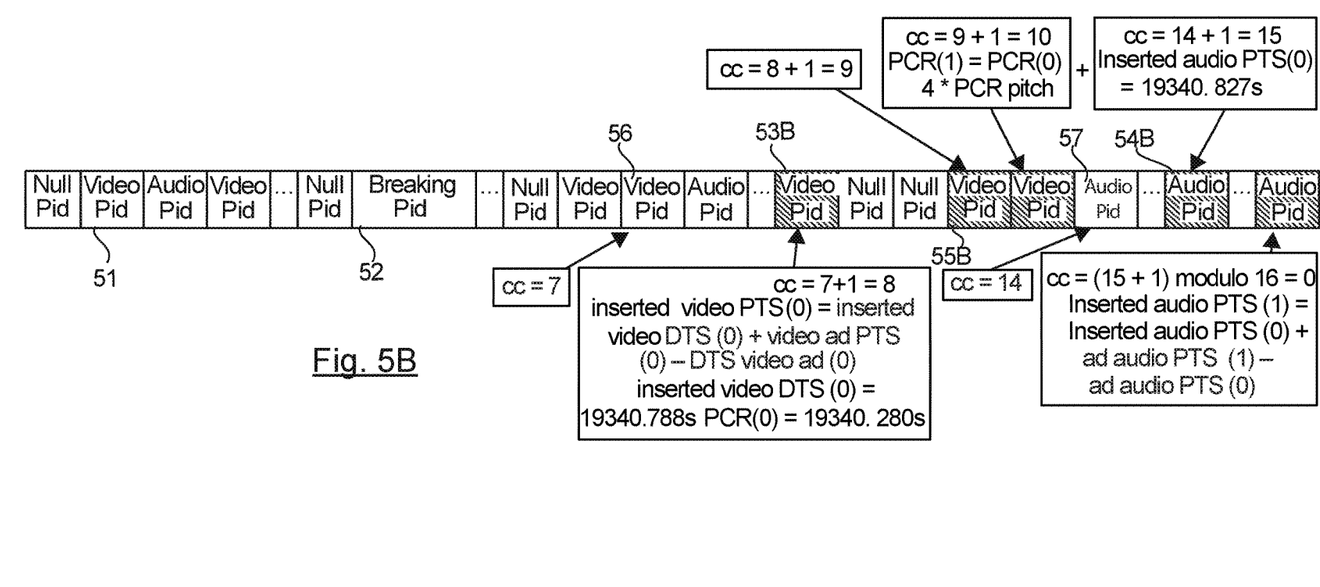

The modified stream thus obtained is illustrated in FIG. 5B. According to this example, the first video packet 53A to be replaced of the original stream has been replaced by a first replacement video packet 53B in the modified stream. The first audio packet 54A to be replaced of the original stream has been replaced by a first replacement audio packet 54B in the modified stream. The replacement packets are represented with hatched lines.

Here below, a replacement algorithm for replacing video packets is presented. A similar algorithm can be implemented for replacing audio packets.

During the replacement of the first video packet 53A of the original stream to be replaced by a first replacement video packet 53B in the modified stream, a first counter representing a number of packets between two video packets of the secondary content, denoted as nb_pkt_between_2video_ad_pkt, is initialized at a null value. A first variable representing a number of packets before the next video packet to be replaced, denoted as nb_pkt_next_video_insertion, is initialized at the cumulative value of a video ratio variable denoted as video_insertion_ratio_cumul.

The variable video_insertion_ratio_cumul is defined on the basis of the video ratio: video_insertion_ratio_cumul+=ratio video.

The video ratio is defined by the ratio of an estimation of the bit rate of the original stream and an estimation of the video bit rate of the secondary content (for example an ad (i.e. a commercial)).

$$\text{video ratio} = \frac{\text{estimated bit rate of original stream}}{\text{estimated bit rate of video commercial}}$$

The first image inserted is a reference image and it replaces a reference image. The changing therefore takes place without disturbance for the user.

At each video packet to be replaced of the original stream, the first counter nb_pkt_between_2video_ad_pkt gets incremented. As soon as the first counter nb_pkt_between_2video_ad_pkt is greater than or equal to the first variable nb_pkt_next_video_insertion, then the insertion of video packet of the secondary content is possible, as a replacement for a video packet to be replaced of the original stream. As soon as the video packet of the secondary content is inserted, the first variable nb_pkt_next_video_insertion is updated.

If a video packet to be replaced of the original stream is not replaced by a video packet of the secondary content or contents, because a number of replacement video packets of the secondary content or contents is smaller than the number of video packets to be replaced of the main content, then this video packet to be replaced of the main content is eliminated and a null packet is put in its place in the modified stream.

5.2.3 Step 3: Updating the CC, PTS, DTS and PCR Fields

In order that the replacement of a main content by one or more secondary contents may be transparent to a decoder, the values of the audio and video continuity counters, video PTS and DTS, audio PTS and the reference clock PCR are updated in the replacement packets of the modified stream, as illustrated in FIG. 5B.

More specifically, the reference clock PCR (which is associated with the video packets according to the example illustrated) is updated as follows:

$$PCR(n)=PCR(n-1)+\text{number of packets between two PCR packets}*PCR\text{ pitch}$$

where the PCR pitch is the duration of a packet of the original stream expressed in PCR time, i.e. in number of 27 Mhz clocks strokes, and PCR(0) is equal to the last PCR value before the breaking.

For example, the first replacement video packet 53B carries the reference clock PCR(0) initialized at the last clock value before the breaking, namely PCR(0) =19340.280s. The next replacement video packet carrying a PCR clock signal is the packet 55B such that PCR(1)=PCR(0)+4+PCR pitch The video continuity counter (video CC) and audio continuity counter (audio CC) are updated as follows:
- the video CC of the first replacement video packet 53B is initialized at the value of the continuity counter of the last video packet (56) of the original stream before the first replacement video packet 53B, plus 1: video CC(1)=8
- the video CC of the other replacement video packets is updated according to the formula video CC(n)=(video CC (n−1)+1) modulo 16
- the audio CC of the first replacement audio packet 54B is initialized at the value of the continuity counter of the last audio packet (57) of the original stream before the first replacement audio packet 54B plus 1: audio CC(1) =15
- the audio CC of the other replacement audio packets is updated according to the formula audio CC(n)=(audio CC (n−1)+1) modulo 16.

Several cases are to be singled out for the updating of the video decoding temporal information (video DTS), according to the number of secondary contents.

For the first replacement video packet belonging to a first secondary content, the video DTS of the first replacement video packet 53B is initialized, this packet being denoted as inserted video DTS, at the value of the DTS of the first video packet to be replaced, denoted as live video DTS:

$$\text{inserted video DTS}(0)=\text{live video DTS}=19340.788s$$

For the first replacement video packet belonging to another secondary content (should several commercials be considered for example), the video DTS of this first replacement video packet, denoted as inserted video DTS(n) is initialized according to the formula:

$$\text{inserted video DTS}(n)=(\text{inserted video DTS}(n-1)+\Delta\text{video DTS}(n-1))\text{modulo }2^{33}$$

with:
Δvideo DTS(n−1)=inserted video DTS(n−1)−inserted video DTS(n−2), and
inserted video DTS(n−1) and inserted video DTS(n−2), the last two values of inserted video DTS.

For the other replacement video packets (belonging to a first secondary content or to another secondary content), the following formula is applied:

$$\text{inserted video DTS}(n)=(\text{inserted video DTS}(n-1)+(\text{sec cont video DTS}(n)-\text{sec cont video DTS}(n-1)))\text{modulo }2^{33}$$

with:
sec cont video DTS(n) being the video DTS value of the nth DTS packet of the secondary content, and
sec cont video DTS(n)−sec cont video DTS(n−1) being the DTS pitch of the secondary content.

For the updating of the video presentation temporal information (video PTS) of the replacement packets, the following formula is used:

$$\text{inserted video PTS}(n)=(\text{inserted video DTS}(n)+(\text{sec cont video PTS}(n)-\text{sec cont video DTS}(n)))\text{modulo }2^{33}$$

with:
sec cont video PTS(n) being the PTS video value of the nth PTS packet of the secondary content.

This formula ensures the preservation of the ΔPTS/DTS value of the secondary content. Thus, if, in the secondary content, we have PTS=DTS, then in the replacement packets of the modified stream, we also have PTS=DTS.

Several cases must be distinguished for updating the audio presentation temporal information (audio PTS), depending on the number of secondary contents.

For the first replacement audio packet belonging to a first secondary content, the audio PTS of the first replacement audio packets 54B, denoted as inserted audio PTS, is initialized at the value of the PTS of the first video packet to be replaced, denoted as live audio PTS:

$$\text{inserted audio PTS}(0)=\text{live audio PTS}=19340.827s$$

For the first replacement audio packet belonging to another secondary content (should several commercials be considered for example), the audio PTS value of this first replacement audio packet, denoted as inserted audio PTS(n), is initialized according to the formula:

$$\text{inserted audio PTS}(n)=(\text{inserted audio PTS}(n-1)+\Delta\text{audio PTS}(n-1))\text{modulo }2^{33}$$

with:
Δaudio PTS(n−1)=inserted audio PTS(n−1)−inserted audio PTS(n−2), and
inserted audio PTS(n−1) and inserted audio PTS(n−2) being the last two values of inserted audio PTS.

For the other replacement audio packets (belonging to a first secondary content or to another secondary content), the following formula is applied:

Inserted audio PTS($n$)=(inserted audio PTS($n-1$))+
(sec cont audio PTS($n$)−sec cont audio PTS($n-1$))modulo $2^{33}$ with:
sec cont audio PTS(n) being the audio PTS value of the nth PTS packet of the secondary content, and
sec cont audio PTS(n)−sec cont audio PTS(n−1) is the PTS pitch of the secondary content.

5.2.4 Step 4: Determining Instants of Audio and Video Return

Figure 5C:
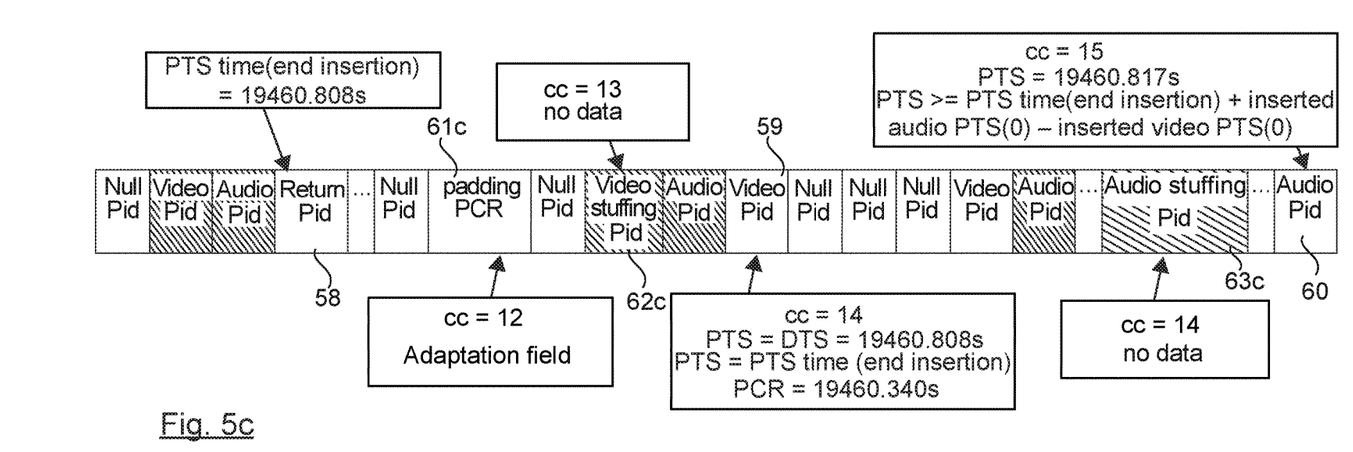

We shall now consider FIG. 5C, illustrating the return to the original stream.

To return from a secondary content towards the main content, it is sought above all to determine an instant of video return and an instant of audio return. According to the example illustrated in FIG. 5C, these items of information are packetized in a packet of the transport stream called a return packet 58. Such a return packet 58 uses for example the SCTE-35 protocol. This return packet indicates either the time of return to the original stream or an immediate return to the original stream.

In the example illustrated in FIG. 5C, the return packet 58 carries a return presentation temporal information, this information indicating the time of return, expressed in PTS time. The return packet 58 corresponds to a reference image. This for example is an IDR image. For example the return packet indicates return at an instant 19460.808s, denoted as PTS time (end insertion).

To determine the instant of video return, the PTS time (end insertion) is compared with the video PTS of the video packets of the modified stream, denoted as live video PTS. The video return is possible when the live video PTS of a video packet of the modified stream is equal to the PTS time (end insertion). According to the example illustrated in FIG. 5C, the video return instant is defined by:

PTS time(end insertion)=live video PTS=19460.808$s$

The first return video packet is therefore the video packet 59.

To determine the instant of audio return, the PTS time (end insertion) is compared with the audio PTS of the audio packets of the modified stream, denoted as live audio PTS. The return audio is possible when the live audio PTS of an audio packet of the modified stream is greater than or equal to an estimated return audio presentation temporal information, denoted as estimated return live audio PTS, determined from the PTS time (end insertion) and replacement video packets and audio packets or subtitle packets of the modified stream:

estimated return live counter PTS=estimated return
live audio PTS=PTS time(end insertion)+
Δinserted video audio PTS with:
Δinserted video audio PTS=inserted audio PTS(0)−inserted video PTS(0)

According to the example illustrated in FIG. 5C, the instant of audio return is defined by the live audio PTS such that: live audio PTS≥estimated return live audio PTS The first return audio packet is therefore the audio packet 60 which has an audio PTS equal 19460.817ss corresponding to the instant of the audio return.

According to another example, not illustrated, the return packet indicates an immediate return. According to this example, the appropriate moment to switch back is also chosen.

Thus, to determine the instant of video return, a search is made for the first reference image encoded in a packet following the return packet in the modified stream. The return presentation temporal information associated with this reference image, denoted as live video PTS, corresponding to the video return instant, is memorized: this value is PTS time (end insertion)=live video PTS.

To determine the instant of audio return, the PTS time (end insertion) is compared with the audio PTS of the audio packets of the modified stream, denoted as live audio PTS. The audio return is possible when the live audio PTS of an audio packet of the modified stream, called the first audio return packet, is greater than or equal to an estimated return audio presentation temporal information, denoted as estimated return live audio PTS, determined from the PTS time (end insertion) and from the replacement video and audio or subtitle packets of the modified stream, as described here above.

5.2.5 Step 5: Return to the Original Stream

Starting from the instant of video return, the replacement of the video packets of the main content by video packets of the secondary content is stopped. Similarly, starting from the instant of audio return, the replacement of the audio packets of the main content by audio packets of the secondary content is stopped.

Here below a detailed description is given of an example of implementation of the return to the main content.

For video processing, it can be noted that, if the number of images belonging to the secondary contents to be inserted is equal to the number of images to be replaced in the original stream, then it is not necessary to carry out a particular processing operation.

If the number of images belonging to the secondary contents to be inserted is smaller than the number of images to be replaced in the original stream, then all the video packets of the secondary content or contents are inserted into the modified stream and the return to the original stream is made as soon as the DTS of a video packet of the modified stream, denoted as live video DTS, is greater than the DTS of the last replacement video packet: live video DTS>last inserted video DTS.

In particular, to improve the visual transition at the time of the return to the original stream, in addition to the condition of live video DTS>last inserted video DTS, the return image is chosen to be a reference image.

If the number of images belonging to the secondary content or contents to be inserted is greater than the number of images to be replaced in the original stream, then the insertion is stopped as soon as:

inserted video DTS≥estimated return live video DTS
with estimated return live video DTS being an estimated return video decoding temporal information determined from the replacement video packets of the modified stream, such that estimated return live video DTS=PTS time(end insertion)+Δinserted video PTS/DTS with: Δinserted video PTS/DTS=inserted video PTS(0)−inserted video DTS(0)

After insertion of the last video packet of the secondary content or contents to be inserted, and so long as the return to the original stream is not possible (i.e. before the instant of video return), if a PCR packet is present in the original stream (for example in a video Pid of the original stream carrying a PCR clock), this packet is kept in the modified stream in retaining only the adaptation field. Such a PCR packet carrying only the adaptation field is also denoted as a padding PCR (reference packet 61C in FIG. 5C).

With regard to audio processing, it is noted that, if the number of audio frames belonging to the secondary content(s) to be inserted is equal to the number of audio frames to be replaced in the original stream, then it is not necessary to carry out a particular processing operation.

If the number of audio frames belonging to the secondary contents to be inserted is smaller than the number of audio frames to be replaced in the original stream, then all the audio packets of the secondary content or contents are inserted into modified stream and the return to the original stream is made as soon as the PTS of an audio packet of the modified stream denoted as audio live PTS, is greater than the PTS of the last replacement audio packet:

live audio PTS>last inserted audio PTS

If the number of audio frames belonging to the secondary content or contents to be inserted is greater than the number of audio frames to be replaced in the original stream, then the insertion is stopped as soon as: inserted audio PTS≥estimated return live audio PTS.

Finally, to ensure the continuity of the video continuity counter (audio continuity counter respectively) between the last replacement video packet (replacement audio packet respectively) and the first return video packet (return audio packet respectively), video stuffing packets (audio stuffing packets respectively) can be inserted into the modified stream.

For example, returning to FIG. 5C, the packet 62C is a video stuffing packet. Similarly, the packet 63C is an audio stuffing packet. Such video/audio stuffing packets do not carry any data but are used to increment the video/audio continuity counter by one unit.

It can be noted that, in order to know the value of the continuity counter of the first return video or audio packet, the modified stream must be placed in a buffer memory. The video or audio stuffing packets can be inserted when it is detected that the next packet of the modified stream is the first return video or audio packet, for example in replacing null packets by video or audio stuffing packets in the modified stream.

5.3 Structure of a Content Replacement Device

Figure 6:
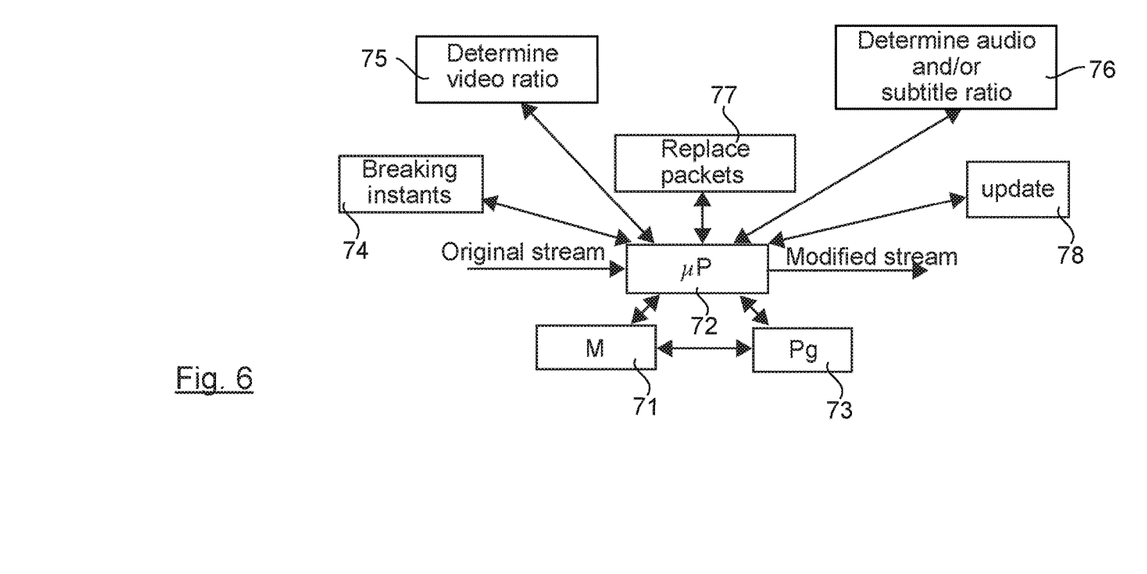
FIG. 6 presents a simplified structure of a device for replacing contents according to one particular embodiment of the invention.

Finally, referring to FIG. 6, we present the simplified structure of a device for replacing contents implementing the method for replacing contents according to the particular embodiment described here above.

Such a device for replacing contents comprises a memory 71, for example a buffer memory, a processing unit 72 equipped for example with a microprocessor µP, and driven by the computer program 73 implementing the method for replacing contents according to the invention.

At initialization, the code instructions of the computer program 73 are for example loaded into a RAM and then executed by the processor of the processing unit 72. The processing unit 72 inputs an original transport stream and at least one secondary content to be inserted into the stream. The microprocessor of the processing unit 72 implements the steps of the method for replacing contents described here above according to the instructions of the computer program 73 to switch from a main program to a secondary program. To this end, the device for replacing contents also comprises:

a module 74 for determining a video breaking instant and at least one audio or subtitle breaking instant on the basis of at least one breaking packet of the original stream, a module 75 for determining a ratio between the bit rate of said original stream and the video bit rate of said secondary content, called a video ratio, a module 76 for determining a ratio between the bit rate of said original stream and the audio bit rate of said secondary content, called an audio ratio and/or a ratio between the bit rate of said original stream and the subtitle bit rate of said secondary content, called a subtitle ratio, a module 77 for the replacement in the original stream of:
  at least one video packet of the main content, called a video packet to be replaced, by at least one video packet of the secondary content or by a null packet, called a replacement video packet, activated as of the video breaking instant, and
  at least one audio packet or subtitle packet of the main content, called an audio packet or subtitle packet to be replaced, by at least one audio packet or subtitle packet of the secondary content or by a null packet, called a replacement audio packet or subtitle packet activated as of the instant or instants of audio or subtitle breaking, delivering a modified stream, a module 78 for the updating in the modified stream of:
  a reference clock,
  a continuity counter of video packets and of at least one video reconstruction temporal information in the replacement video packet or packets, and
  a continuity counter of audio or subtitle packets and of at least one audio or subtitle reconstruction temporal information in the replacement audio or subtitle packet or packets, taking account of the video reconstruction temporal information.

These modules can be driven by the microprocessor of the processing unit 72.

The invention claimed is:

1. A method of replacement of a main content by at least one secondary content, said main content being carried by a transport stream, issued by a fixed transmitter and addressed to a plurality of broadcasting sites, called an original stream, wherein the method implements the following steps, in at least one device for replacing contents associated with at least one of said broadcasting sites, determining an instant of video breaking and at least one instant of audio or subtitle breaking, on the basis of at least one breaking packet of said original stream, determining a ratio between the bit rate of said original stream and the video bit rate of said secondary content, called a video ratio, determining a ratio between the bit rate of said original stream and the audio bit rate of said secondary content, called an audio ratio, and/or a ratio between the bit rate of said original stream and the subtitle bit rate of said secondary content, called a subtitle ratio, replacing in said original stream:
  at least one video packet of said main content, called a video packet to be replaced, by at least one video packet of said secondary content or by a null packet, called a replacement video packet, starting from said video breaking instant, and
  at least one audio packet or subtitle packet of said main content, called an audio packet or subtitle packet to be replaced, by at least one audio packet or subtitle packet of said secondary content or by a null packet, called a replacement audio packet or subtitle packet starting from said at least one audio or subtitle breaking instant, delivering a modified stream, said step of replacing implementing the following sub-steps:

for the replacement of at least one video packet to be replaced of said main content:
  initialization of a first counter representing a number of packets between two replacement video packets of the secondary content at a null value and of a first variable representing a number of packets before the next video packet to be replaced at the value of a cumulative video ratio variable defined on the basis of said video ratio,
  at each video packet to be replaced of said original stream:
    incrementing of said first counter,
    replacement of said video packet to be replaced by one of said video packets of the secondary content when the value of said first counter is greater than or equal to the value of said first variable,
    replacement of said video packet to be replaced by a null packet, else,
    updating of said first variable;

for the replacement of at least one audio packet or subtitle packet to be replaced of said main content:
  initialization of a second counter representing a number of packets between two replacement audio packets or subtitle packets of the secondary content at a null value, and of a second variable representing a number of packets before the next audio packet or subtitle packet to be replaced at the value of a cumulative variable of audio ratio or subtitle ratio defined on the basis of said audio or subtitle ratio,
  at each audio packet or subtitle packet to be replaced of said original stream:
    incrementing of said second counter,
    replacement of said audio packet or subtitle packet to be replaced by one of said audio or subtitle packets of the secondary content when the value of said second counter is greater than or equal to the value of said second variable,
    replacement of said audio packet to be replaced with a null packet, else,
    updating of said second variable, updating, in said modified stream:
  a reference clock,
  a continuity counter of video packets and at least one video reconstruction temporal information in said replacement video packet or packets, and
  a continuity counter of audio packets or subtitle packets and at least one audio or subtitle reconstruction temporal information in said replacement audio or subtitle packet or packets, taking account of said at least one video reconstruction temporal information.

2. The method of replacement according to claim 1, wherein said step of determining an instant of a video breaking and at least one instant of audio or subtitle breaking implements the following sub-steps:
  detection of a first reference image encoded in a packet following said breaking packet in said original stream,
  obtaining of a breaking presentation temporal information associated with said first reference image, delivering said instant of video breaking,
  comparison of said breaking presentation temporal information with an audio or subtitle presentation temporal information associated with at least one audio packet or subtitle packet of the original stream,
  when said audio or subtitle presentation temporal information associated with an audio packet or subtitle packet of said original stream, called a first audio packet or subtitle packet to be replaced, is greater than or equal to said breaking presentation temporal information: assigning of said audio or subtitle presentation temporal information associated with said first audio packet or subtitle packet to be replaced to said at least one instant of audio or subtitle breaking.

3. The method of replacement according to claim 1, wherein said step of determining an instant of video breaking and at least one instant of audio or subtitle breaking implements the following sub-steps:
  obtaining, from said breaking packet, of a breaking presentation temporal information associated with said original stream,
  comparison of said breaking presentation temporal information with a video presentation temporal information associated with at least one video packet of said original stream,
  when said breaking presentation temporal information and said video presentation temporal information associated with a video packet of said original stream, called a first video packet to be replaced, are identical: assigning of said video presentation temporal information, associated with the first video packet to be replaced, to said instant of video breaking,
  comparison of said breaking presentation temporal information with an audio or subtitle presentation temporal information associated with at least one audio packet or subtitle packet of said original stream,
  when said audio or subtitle presentation temporal information associated with an audio packet or subtitle packet of said original stream, called a first audio packet or subtitle packet to be replaced, is greater than or equal to said breaking presentation temporal information: assigning said audio or subtitle presentation temporal information, associated with the first audio packet or subtitle packet to be replaced, to said at least one instant of audio or subtitle breaking.

4. The method of replacement according to claim 1, wherein said step of updating a reference clock implements the following formula:

$$PCR(n)=PCR(n-1)+\text{number of packets between two PCR packets}*\text{PCR pitch}$$

with:
PCR(n) the reference clock of the nth packet carrying a reference clock, n≥1,
PCR(0) the value of the reference clock of the last packet carrying a reference clock of said original stream before said first replacement video packet, and
PCR pitch corresponds to the duration of a packet of said original stream.

5. The method of replacement according to claim 1, wherein said step of updating a continuity counter of video packets and at least a video reconstruction temporal information implements the following sub-steps:
  for the updating of said continuity counter of video packets:
    initialization of said continuity counter of the first replacement video packet at the value of the continuity counter of the last video packet of said original stream before said first replacement video packet plus one;

updating said continuity counter of the other replacement video packets according to the following formula:

video CC($n$)=(video CC($n$−1)+1)modulo 16 with video CC(n) being the continuity counter of the nth replacement video packet, n>1;

for the updating said at least one video reconstruction temporal information:

for the updating of a video decoding temporal information:

for the first replacement video packet belonging to a first secondary content, initialization of the video decoding temporal information of the first replacement video packet at the value of a video decoding temporal information of the first video packet replaced;

for the first replacement video packet belonging to another secondary content, initialization of the video decoding temporal information of the first replacement video packet according to the formula:

inserted video DTS($n$)=(inserted video DTS($n$−1)+ Δvideo DTS($n$−1))modulo $2^{33}$ with inserted video DTS(n) the value of the video decoding temporal information of the nth packet carrying a video decoding temporal information among said replacement video packets of said modified stream, Δvideo DTS($n$−1)=inserted video DTS($n$−1)−inserted video DTS($n$−2)

updating the video decoding temporal information of the other replacement video packets according to the formula:

inserted video $DTS(n)$ = (inserted video $DTS(n-1)$ +

(sec cont video $DTS(n)$ − sec cont video $DTS(n-1)$))modulo$2^{33}$ with sec cont video DTS(n) the value of the video decoding temporal information of the nth packet carrying a video decoding temporal information among said video packets of said secondary content, for the updating of a video presentation temporal information:

updating the video presentation temporal information of the replacement video packets according to the following formula:

inserted video PTS($n$)=(inserted video DTS($n$)+(sec cont video PTS($n$)−sec cont video DTS($n$))) modulo $2^{33}$ with inserted video PTS(n) being the value of video presentation temporal information of the nth packet carrying video presentation temporal information among said replacement video packets of said modified stream, sec cont video PTS(n) being the value of video presentation temporal information of the nth packet carrying a video presentation temporal information among said video packets of said secondary content.

6. The method of replacement according to claim 1, wherein said first step of updating a continuity counter of audio packets or subtitle packets and of at least an audio or subtitle reconstruction temporal information implements the following sub-steps:

for the updating of said continuity counter of audio or subtitle packets:

initialization of said continuity counter of the first replacement audio packet or subtitle packet at the value of the continuity counter of the last audio packet or subtitle packet of said original stream before said first replacement audio packet or subtitle packet, plus one;

updating of said continuity counter of the other replacement audio or subtitle packets according to the following formula:

CC count($n$)=(CC count($n$−1)+1)modulo 16 with CC count(n) being the audio or subtitle continuity counter of the nth replacement audio packet or subtitle packet, n>1;

for the updating of said at least one audio or subtitle reconstruction temporal information:

for the first replacement audio packet or subtitle packet belonging to a first secondary content, initialization of an audio or subtitle presentation temporal information of the first replacement audio packet or subtitle packet at the value of an audio or subtitle presentation temporal information of the first replaced audio packet or subtitle packet;

for the first replacement audio packet or subtitle packet belonging to another secondary content, initialization of the audio or subtitle presentation temporal information of the first replacement audio packet or subtitle packet according to the formula:

inserted count PTS($n$)=(inserted count PTS($n$−1)+ Δcount PTS($n$−1))modulo $2^{33}$ with inserted count PTS(n) being the value of the audio or subtitle presentation temporal information of the nth packet carrying an audio or subtitle presentation temporal information among said replacement audio or subtitle packets of said modified stream, Δcount PTS($n$−1)=inserted count PTS($n$−1)−inserted count PTS($n$−2)

updating the audio or subtitle presentation temporal information of the other replacement audio or subtitle packets according to the formula:

inserted count $PTS(n)$ = (inserted count $PTS(n-1)$ +

(sec cont count $PTS(n)$ − sec cont count $PTS(n-1)$))modulo$2^{33}$ with sec cont count PTS(n) being the value of the audio or subtitle presentation temporal information of the nth packet carrying an audio or subtitle presentation temporal information among said audio or subtitle packets of said secondary content.

7. The method of replacement according to claim 1, further comprising a step of determining an instant of video return and at least one instant of audio or subtitle return, on the basis of a return packet (58) of said modified stream.

8. The method of replacement according to claim 7, wherein said step of determining an instant of video return and at least one instant of audio or subtitle return implements the following sub-steps:

detection of a second encoded reference image in a packet following said return packet in said modified stream,     obtaining of a return presentation temporal information associated with said second reference image, delivering said instant of video return,     comparison of said return presentation temporal information with an audio or subtitle presentation temporal information associated with at least one audio packet or subtitle packet of said modified stream,     when said audio or subtitle presentation temporal information associated with an audio packet or subtitle packet of the modified stream, called a first return audio packet or subtitle packet, is greater than or equal to an estimated return audio or subtitle presentation temporal information, determined from said return presentation temporal information and from said replacement video and audio or subtitle packets in said modified stream: assigning said audio or video presentation temporal information, associated with said first return audio packet or subtitle packet, to said at least one instant of audio or subtitle return.

9. The method of replacement according to claim 7, wherein said step of determining an instant of video return and at least one instant of audio or subtitle return implements the following sub-steps:

obtaining, from said return packet, of a return presentation temporal information associated with said modified stream,     comparison of said return presentation temporal information with a video presentation temporal information associated with at least one video packet of said modified stream,     when said return presentation temporal information and said video presentation temporal information associated with a video packet of said modified stream, called a first return video packet, are identical: assigning said video presentation temporal information, associated with said first return video packet, to said instant of video return,     comparison of said return presentation temporal information with an audio or subtitle presentation temporal information associated with at least one audio packet or subtitle packet of said modified stream,     when said audio or subtitle presentation temporal information associated with an audio packet or subtitle packet of said modified stream, called a first return audio packet or subtitle packet, is greater than or equal to an estimated return subtitle or audio presentation temporal information, determined from said return presentation temporal information and from said replacement video and audio or subtitle packets of said modified stream: assigning said audio or subtitle presentation temporal information associated with said first return audio packet or subtitle packet to said at least one instant of audio or subtitle return.

10. The method of replacement according to claim 8, wherein said estimated audio or subtitle presentation temporal information is determined as follows:

$$\text{estimated return live count PTS} = \text{PTS time(end insertion)} + \Delta\text{inserted video count PTS}$$

with:

$\Delta$inserted video count PTS=inserted count PTS(0)−inserted video PTS(0)

PTS time (end insertion) is said return presentation temporal information, inserted count PTS(0) is said audio or video presentation temporal information of the first replacement audio packet or subtitle packet, inserted video PTS(0) is said video presentation temporal information of the first replacement video packet.

11. The method of replacement according to claim 1, wherein:

if the number of images belonging to said at least one secondary content is smaller than the number of images belonging to the main content to be replaced, all the images belonging to said at least one secondary content are inserted into said modified stream and the return to said original stream is implemented when a video decoding temporal information of a video packet of the modified stream is greater than the video decoding temporal information of the last replacement video packet of the modified stream;

if the number of images belonging to said at least one secondary content is greater than the number of images belonging to the main content to be replaced, the images belonging to said at least one secondary content are inserted into the modified stream so long as the video decoding temporal information of the replacement video packets is smaller than an estimated return video decoding temporal information.

12. The method of replacement according to claim 11, wherein said estimated return video decoding temporal information is determined as follows:

$$\text{estimated return live video DTS} = \text{PTS time(end insertion)} + \Delta\text{inserted video PTS/DTS}$$

with:

$\Delta$inserted video PTS/DTS=inserted video PTS(0)−inserted video DTS(0)

PTS time (end insertion) being said return presentation temporal information, inserted video PTS(0) is said video presentation temporal information of the first replacement video packet, and inserted video DTS(0) is said video decoding temporal information of the first replacement video packet.

13. The method of replacement according to claim 1, wherein:

if the number of audio or subtitle frames belonging to said at least one secondary content is smaller than the number of audio or subtitle frames belonging to the main content to be replaced, then all the audio or subtitles frames belonging to said at least one secondary content are inserted into said modified stream and the return to said original stream is implemented when an audio or subtitle presentation temporal information of said modified stream is greater than the audio or subtitle presentation temporal information of the last replacement audio packet or subtitle packet of said modified stream;

if the number of audio or subtitle frames belonging to said at least one secondary content is greater than the number of audio or subtitle frames belonging to the main content to be replaced, then the audio or subtitle frames belonging to said at least one secondary content are inserted into the modified stream so long as the audio or subtitle presentation temporal information of the replacement audio or subtitle packets is smaller than an estimated return audio or subtitle presentation temporal information.

14. The method of replacement according to claim 7, wherein, after the last replacement video packet of said modified stream and before said instant of video return, if a packet carrying a reference clock is detected, then said packet carrying a reference clock is modified to preserve only an adaptation field of said reference clock in said modified stream.

15. The method of replacement according to claim 1, further comprising a step of inserting at least one stuffing packet into the modified stream if the number of video packets, and audio or subtitle packets respectively, belonging to said at least one secondary content, is smaller to the number of video packets, and audio or subtitle packets respectively, belonging to the main content to be replaced.

16. A device for replacing a main content by at least one secondary content,
said main content being carried by a transport stream, issued from a fixed transmitter and addressed to a plurality of broadcasting sites, called an original stream,
wherein said device is associated with at least one of said broadcasting sites and comprises:
a processor; and
a non-transitory computer-readable medium comprising instructions stored thereon, which when executed by the processor configure the processor to perform acts comprising:
determining an instant of video breaking and at least one instant of audio or subtitle breaking, from at least one breaking packet of said original stream,
determining a ratio between the bit rate of said original stream and the video bit rate of said secondary content, called a video ratio,
determining a ratio between the bit rate of said original stream and the audio bit rate of said secondary content, called an audio ratio and/or a ratio between the bit rate of said original stream and the bit rate of the subtitle of said secondary content, called a subtitle ratio,
replacement, in said original stream:
of at least one video packet of said main content, called a video packet to be replaced, by at least one video packet of said secondary content or by a null packet, called a replacement video packet, activated from said instant of video breaking, and
at least one audio packet or subtitle packet of said main content, called an audio packet or subtitle packet to be replaced, by at least one audio packet or subtitle packet of said secondary content or by a null packet, called a replacement audio packet or subtitle packet, activated from said at least one instant of audio or subtitle breaking,
delivering a stream,
said replacement comprising:
for replacement of at least one video packet to be replaced of said main content, operating a first counter representing a number of packets between two replacement video packets of the secondary content, at a null value, and a first variable representing a number of packets before the next video packet to be replaced at the value of a cumulative variable of video ratio, defined from said video ratio,
for replacement of at least one audio packet or subtitle packet to be replaced of said main content, operating a second counter representing a number of packets between two replacement audio packets or subtitle packets of the secondary content at a null value, and a second variable representing a number of packets before the next audio packet or subtitle packet to be replaced at the value of a cumulative variable of audio or subtitle ratio, defined from said audio or subtitle ratio,
updating in said modified stream:
a reference clock,
a continuity counter for counting video packets and at least one video reconstruction temporal information in said replacement video packet or packets, and
a continuity counter of audio or subtitle packets and at least one audio or subtitle reconstruction temporal information in said replacement audio or subtitle packet or packets, taking account of said at least one video reconstruction temporal information.

17. At least one non-transitory computer-readable medium comprising a computer program stored thereon comprising instructions to implement a method of replacement of a main content by at least one secondary content, when this program can be executed by at least one processor in at least one device for replacing contents associated with at least one of said broadcasting sites, said main content being carried by a transport stream, issued by a fixed transmitter and addressed to a plurality of broadcasting sites, called an original stream, wherein the method implements the following steps in the at least one device:
determining an instant of video breaking and at least one instant of audio or subtitle breaking, on the basis of at least one breaking packet of said original stream,
determining a ratio between the bit rate of said original stream and the video bit rate of said secondary content, called a video ratio,
determining a ratio between the bit rate of said original stream and the audio bit rate of said secondary content, called an audio ratio, and/or a ratio between the bit rate of said original stream and the subtitle bit rate of said secondary content, called a subtitle ratio,
replacing in said original stream:
at least one video packet of said main content, called a video packet to be replaced, by at least one video packet of said secondary content or by a null packet, called a replacement video packet, starting from said video breaking instant, and
at least one audio packet or subtitle packet of said main content, called an audio packet or subtitle packet to be replaced, by at least one audio packet or subtitle packet of said secondary content or by a null packet, called a replacement audio packet or subtitle packet starting from said at least one audio or subtitle breaking instant,
delivering a modified stream,
said step of replacing implementing the following substeps:
for the replacement of at least one video packet to be replaced of said main content:
initialization of a first counter representing a number of packets between two replacement video packets of the secondary content at a null value and of a first variable representing a number of packets before the next video packet to be replaced at the value of a cumulative video ratio variable defined on the basis of said video ratio, at each video packet to be replaced of said original stream:
- incrementing of said first counter,
- replacement of said video packet to be replaced by one of said video packets of the secondary content when the value of said first counter is greater than or equal to the value of said first variable,
- replacement of said video packet to be replaced by a null packet, else,
- updating of said first variable;

for the replacement of at least one audio packet or subtitle packet to be replaced of said main content:
- initialization of a second counter representing a number of packets between two replacement audio packets or subtitle packets of the secondary content at a null value, and of a second variable representing a number of packets before the next audio packet or subtitle packet to be replaced at the value of a cumulative variable of audio ratio or subtitle ratio defined on the basis of said audio or subtitle ratio, at each audio packet or subtitle packet to be replaced of said original stream:
- incrementing of said second counter,
- replacement of said audio packet or subtitle packet to be replaced by one of said audio or subtitle packets of the secondary content when the value of said second counter is greater than or equal to the value of said second variable,
- replacement of said audio packet to be replaced with a null packet, else,
- updating of said second variable, updating, in said modified stream:
- a reference clock,
- a continuity counter of video packets and at least one video reconstruction temporal information in said replacement video packet or packets, and
- a continuity counter of audio packets or subtitle packets and at least one audio or subtitle reconstruction temporal information in said replacement audio or subtitle packet or packets, taking account of said at least one video reconstruction temporal information.

* * * * *